US012767117B2

(12) United States Patent
Yan et al.

(10) Patent No.: US 12,767,117 B2
(45) Date of Patent: Oct. 20, 2026

(54) SYSTEM FOR CHARGING AND DISCHARGING A VEHICLE BATTERY BASED ON A STATE-OF-CHARGE

(71) Applicant: GM Global Technology Operations LLC, Detroit, MI (US)

(72) Inventors: YiChun Yan, Shanghai (CN); Dave Gerard Rich, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 183 days.

(21) Appl. No.: 18/796,965

(22) Filed: Aug. 7, 2024

(65) Prior Publication Data

US 2026/0034977 A1 Feb. 5, 2026

(30) Foreign Application Priority Data

Aug. 1, 2024 (CN) ......................... 202411050347.7

(51) Int. Cl.

| | |
|---|---|
| ***B60W 20/13*** | (2016.01) |
| ***B60W 10/06*** | (2006.01) |
| ***B60W 10/26*** | (2006.01) |
| ***H02J 7/82*** | (2026.01) |
| ***H02J 7/90*** | (2026.01) |
| ***H02J 7/96*** | (2026.01) |

(52) U.S. Cl.

CPC ............ *B60W 20/13* (2016.01); *B60W 10/06* (2013.01); *B60W 10/26* (2013.01); *H02J 7/82* (2026.01); *H02J 7/96* (2026.01); *H02J 7/977* (2026.01); *B60W 2510/244* (2013.01); *B60W 2510/246* (2013.01); *B60W 2510/305* (2013.01); *B60W 2710/244* (2013.01); *B60W 2710/305* (2013.01)

(58) Field of Classification Search

CPC ...... B60W 20/13; B60W 10/06; B60W 10/26; B60W 2510/244; B60W 2510/246; B60W 2510/305; B60W 2710/244; B60W 2710/305; H02J 7/82; H02J 7/96; H02J 7/977

See application file for complete search history.

(56) References Cited

U.S. PATENT DOCUMENTS

| | | | | |
|---|---|---|---|---|
| 2016/0236586 | A1* | 8/2016 | Soo | B60L 1/006 |
| 2016/0276843 | A1* | 9/2016 | Chang | B60L 50/60 |
| 2017/0341520 | A1* | 11/2017 | Chang | B60L 50/60 |

FOREIGN PATENT DOCUMENTS

| | | | |
|---|---|---|---|
| DE | 102008008238 | A1 | 8/2008 |
| DE | 102015007913 | A1 | 12/2016 |

* cited by examiner

*Primary Examiner* — Hitesh Patel
*Assistant Examiner* — Joshua Jeffrey Penko
(74) *Attorney, Agent, or Firm* — Vivacqua Crane, PLLC

(57) ABSTRACT

A system for charging and discharging a vehicle battery in a vehicle. The vehicle may receive at least a portion of the motive power from an internal combustion engine (ICE) that is connected to a generator, or, in the alternative, the vehicle receives all motive power from one or more electric motors powered by a traction battery pack in electrical communication with an auxiliary power module (APM). The system charges and discharges the vehicle battery based on a comparison between the state-of-charge of the vehicle battery and the target state-of-charge range of the vehicle battery. Charging and discharging the vehicle battery creates a balance between a charging capacity and a discharging capacity of the vehicle battery.

20 Claims, 4 Drawing Sheets

SYSTEM FOR CHARGING AND DISCHARGING A VEHICLE BATTERY BASED ON A STATE-OF-CHARGE

INTRODUCTION

The present disclosure relates to a system for charging and discharging a vehicle battery for a vehicle based on a state-of-charge (SOC) of the vehicle battery. In one embodiment, the vehicle receives at least a portion of its motive power from an internal combustion engine (ICE). In an alternative embodiment, the vehicle is an all-electric vehicle (EV).

A starting, lighting, and ignition (SLI) battery, which may also be referred to as a vehicle battery or an auxiliary battery, is a rechargeable battery for providing current to a starter motor to start an internal combustion engine of a vehicle. The vehicle battery also provides power to various electrical accessories in the vehicle such as, for example, the vehicle's headlights and taillights, the climate control system, and the radio. Some electric vehicles (EVs) also include a vehicle battery in addition to the traction battery pack. When used in an electric vehicle, the vehicle battery may be referred to as an auxiliary battery.

There are a number of challenges that a vehicle battery may encounter. For example, start-stop internal combustion engines automatically shut off when a vehicle is idling and restart when a driver's foot leaves the brake pedal. When the start-stop engine is shut off, the vehicle relies upon the vehicle battery for the electrical energy required to power the electrical loads instead of the vehicle's alternator, which results in significantly more discharge cycles experienced by the vehicle battery.

Another challenge the vehicle battery may encounter is sulfation. Sulfation refers to the formation or buildup of lead sulfate crystals on and within the pores of the lead plates of a lead-acid battery. If left unattended, the lead sulfate crystals continue to grow and harder over time and may impede the vehicle battery's ability to charge and discharge. The state-of-charge (SOC) of a vehicle battery is expressed as the ratio of the available capacity and the maximum possible charge that may be stored by the vehicle battery. A vehicle battery's capacity and ability to hold a charge decreases over time. Thus, the SOC of an older vehicle battery has less capacity and ability to hold a charge when compared to its new equivalent, even when subjected to the same charging conditions.

Thus, while current vehicle batteries achieve their intended purpose, there is a need in the art for an improved approach for charging and discharging vehicle batteries.

SUMMARY

According to several aspects, a system for charging and discharging a vehicle battery in a vehicle is disclosed, where the vehicle receives at least a portion of motive power from an internal combustion engine (ICE) that drives a generator. The system includes one or more controllers in electronic communication with the vehicle battery and the generator, where the one or more controllers include one or more processors that execute instructions to determine, by the one or more controllers, a state-of-charge of the vehicle battery. The one or more controllers compare the state-of-charge of the vehicle battery with a target state-of-charge range of the vehicle battery. In response to determining the state-of charge of the vehicle battery falls within the target state-of-charge range, the one or more controllers instruct the vehicle battery to discharge at a regular discharge target current for a first period of time while maintaining a voltage of the vehicle battery at a regular discharge target voltage. The one or more controllers instruct the vehicle battery to discharge at a neutral discharge target current for a second period of time at a neutral discharge target voltage, where the second period of time is less than the first period of time. The one or more controllers instruct the vehicle to startup, where the generator is driven by the ICE upon startup of the vehicle. The one or more controllers instruct the generator to execute at least a minimum number of charging cycles to charge and discharge the vehicle battery based on a regulator voltage control (RVC) voltage, where charging and discharging the vehicle battery creates a balance between a charging capacity and a discharging capacity of the vehicle battery.

In another aspect, the one or more controllers execute a charging cycle by instructing the generator to raise the RVC voltage supplied to the vehicle battery to raise a voltage of the vehicle battery to the neutral discharge target voltage for a third period of time, where the third period of time is less than the first period of time.

In yet another aspect, the one or more controllers execute the charging cycle by instructing the generator to drop the RVC voltage supplied to the vehicle battery to increase a discharge current of the vehicle battery to the regular discharge target current for the first period of time.

In an aspect, the one or more controllers execute the charging cycle by determining a battery temperature of the vehicle battery and comparing the battery temperature with a target battery temperature range.

In another aspect, the one or more controllers execute the charging cycle by in response to determining the battery temperature is within the target battery temperature range, instructing the generator to pulse charge the vehicle battery by raising the RVC voltage supplied to the vehicle battery at a rate that is limited a slew rate of the generator. The pulse charge includes: starting the RVC voltage at a neutral charge target voltage, increasing the RVC voltage to a maximum charging voltage of the vehicle battery, and maintaining the RVC voltage at the maximum charging voltage of the vehicle battery for a fourth period of time.

In yet another aspect, the maximum charging voltage of the vehicle battery is adjusted based on the battery temperature, and wherein a temperature-adjusted maximum charging voltage is expressed as follows:

$$\text{temperature-adjusted maximum charging voltage} = Vstd + (25 - Tt) * 0.003 * 6$$

where Tt represents a real temperature of the vehicle battery and Vstd is a standard maximum charging voltage of the vehicle battery during the pulse charge.

In an aspect, the one or more controllers execute the charging cycle by in response to determining the battery temperature falls outside the target battery temperature range, instructing the generator to pulse charge the vehicle battery by raising the RVC voltage supplied to the vehicle battery at a rate that is limited a slew rate of the generator. The pulse charge includes: starting the RVC voltage at a neutral charge target voltage, increasing the RVC voltage to a maximum temperature-adjusted voltage that is based on the battery temperature, where the maximum temperature-adjusted voltage of the vehicle battery is a function of the battery temperature, and maintaining the RVC voltage at the maximum temperature-adjusted voltage of the vehicle battery for a fourth period of time.

In another aspect, the maximum temperature-adjusted voltage of the vehicle battery 14 is 0.003 Volts/cell at an adjusted maximum charging voltage, and wherein the adjusted maximum charging voltage is expressed as:

$$Vadjust = Vstd + (25 - Tt) * 0.003 * 6$$

where Vadjust represents the adjusted maximum charging voltage, Tt represents a real temperature of the vehicle battery, and Vstd represents a standard maximum charging voltage of the vehicle battery during the pulse charge.

In yet another aspect, the one or more controllers execute a charging cycle by: instructing the generator to reduce the RVC voltage to a neutral charge target voltage to charge the vehicle for a fifth period of time, where the first period of time, the second period of time, the third period of time, the fourth period of time, and the fifth period of time are each selected so that a total charging time required for the vehicle battery is a predetermined percentage of a total running time of the vehicle.

In an aspect, the one or more controllers execute instructions to compare the state-of-charge of the vehicle battery with a lowest value of the target state-of-charge range, and in response to determining the state-of charge of the vehicle battery is equal to or less than the lowest value of the target state-of-charge range, compare a voltage of the vehicle battery with a threshold resting voltage, wherein the threshold resting voltage indicates the vehicle battery requires replacement.

In another aspect, the vehicle battery is a 12 Volt direct current battery, the regular discharge target current is about 0.25 C20, and the regular discharge target voltage is no lower than about 11.5 Volts.

In an aspect, a method for charging and discharging a vehicle battery in a vehicle is disclosed, where the vehicle receives at least a portion of motive power from a ICE that drives a generator. The method includes determining, by one or more controllers, a state-of-charge of the vehicle battery, where the one or more controllers are in electronic communication with the vehicle battery and the generator. The method includes comparing, by the one or more controllers, the state-of-charge of the vehicle battery with a target state-of-charge range of the vehicle battery. In response to determining the state-of charge of the vehicle battery falls within the target state-of-charge range, the method includes instructing the vehicle battery to discharge at a regular discharge target current for a first period of time while maintaining a voltage of the vehicle battery at a regular discharge target voltage. The method includes instructing, by the one or more controllers, the vehicle battery to discharge at a neutral discharge target current for a second period of time at a neutral discharge target voltage, where the second period of time is less than the first period of time. The method includes instructing, by the one or more controllers, the vehicle to startup, where the generator is driven by the ICE upon startup of the vehicle. Finally, the method includes instructing, by the one or more controllers, the generator to execute at least a minimum number of charging cycles to charge and discharge the vehicle battery based on a regulator voltage control (RVC) voltage, where charging and discharging the vehicle battery creates a balance between a charging capacity and a discharging capacity of the vehicle battery.

In another aspect, a system for charging and discharging a vehicle battery in a vehicle is disclosed, where the vehicle receives all motive power from one or more electric motors powered by a traction battery pack in electrical communication with an auxiliary power module (APM). The system includes one or more controllers in electronic communication with the vehicle battery and the APM. The one or more controllers include one or more processors that execute instructions to determine, by the one or more controllers, a state-of-charge of the vehicle battery. The one or more controllers compare the state-of-charge of the vehicle battery with a target state-of-charge range of the vehicle battery. in response to determining the state-of charge of the vehicle battery falls within the target state-of-charge range, the one or more controllers instruct the vehicle battery to discharge at an initial discharge target current for a first period of time while maintaining a voltage of the vehicle battery at a regular discharge target voltage. The one or more controllers instruct the vehicle to startup, where the APM provides an APM voltage to the vehicle battery upon startup of the vehicle. The one or more controllers instruct the APM to execute at least a minimum number of charging cycles to charge and discharge the vehicle battery based on an APM voltage, where charging and discharging the vehicle battery creates a balance between a charging capacity and a discharging capacity of the vehicle battery.

In another aspect, the one or more controllers execute a charging cycle by instructing the APM to drop the APM voltage supplied to the vehicle battery to lower the voltage of the vehicle battery to the regular discharge target voltage for a second period of time, where the second period of time is greater than the first period of time.

In yet another aspect, the one or more controllers execute a charging cycle by determining a battery temperature of the vehicle battery and comparing the battery temperature with a target battery temperature range.

In an aspect, the one or more controllers execute the charging cycle by in response to determining the battery temperature falls within the target battery temperature range, instructing the APM to pulse charge the vehicle battery by raising the APM voltage supplied to the vehicle battery at a rate that is limited a slew rate of the APM. The pulse charge includes: starting the APM voltage at a neutral charge target voltage, increasing the APM voltage to a maximum charging voltage of the vehicle battery, and maintaining the APM voltage at the maximum charging voltage of the vehicle battery for a third period of time.

In another aspect, the one or more controllers execute the charging cycle by in response to determining the battery temperature falls outside the target battery temperature range, instructing the APM to pulse charge the vehicle battery by raising the APM voltage supplied to the vehicle battery at a rate that is limited a slew rate of the APM. The pulse charge includes starting the APM voltage at a neutral charge target voltage, increasing the APM voltage to a maximum temperature-adjusted voltage that is based on the battery temperature, wherein the maximum temperature-adjusted voltage of the vehicle battery is a function of the battery temperature, and maintaining the APM voltage at the maximum temperature-adjusted voltage of the vehicle battery for a third period of time.

In yet another aspect, the maximum temperature-adjusted voltage of the vehicle battery 14 is 0.003 Volts/cell at an adjusted maximum charging voltage, and where the adjusted maximum charging voltage is expressed as:

$$V_{adjust} = V_{std} + (25 - T_t) * 0.003 * 6$$

where Vadjust represents the adjusted maximum charging voltage, Tt represents a real temperature of the vehicle battery, and Vstd represents a standard maximum charging voltage of the vehicle battery during the pulse charge.

In an aspect, the one or more controllers execute the charging cycle by instructing the APM to reduce the APM voltage to the neutral charge target voltage to charge the vehicle battery for a fourth period of time.

In another aspect, the one or more controllers execute the charging cycle by instructing the APM to reduce the APM voltage to the regular discharge target voltage, where the vehicle battery discharges at a neutral discharge target current for a fifth period of time, where the first period of time, the second period of time, the third period of time, the fourth period of time, and the fifth period of time are each selected so that a total charging time required for the vehicle battery is a predetermined percentage of a total running time of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
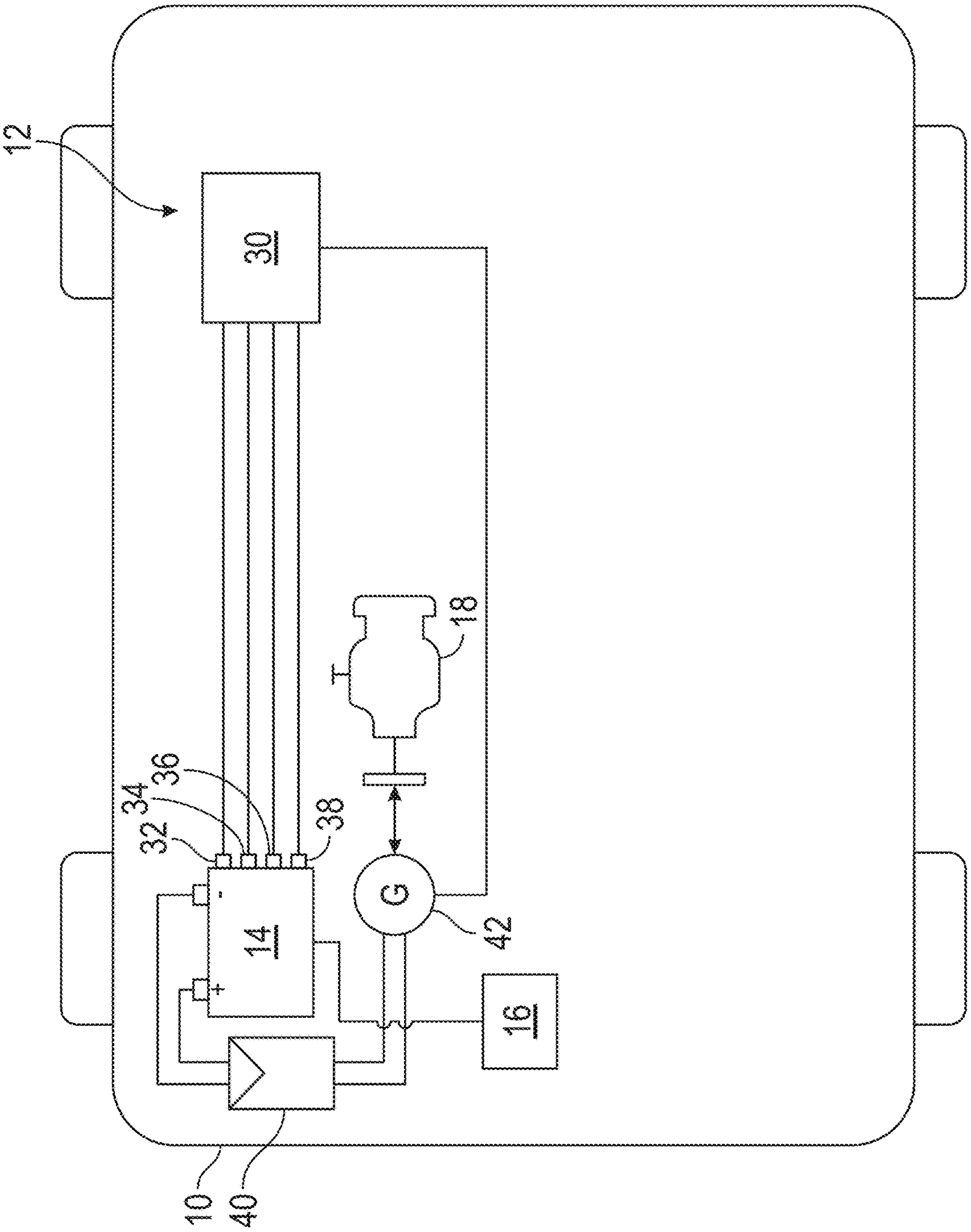
FIG. 1A is a schematic diagram of the disclosed system in a vehicle that receives at least a portion of its motive power from an internal combustion engine (ICE), where the system includes one or more controllers in electronic communication with a vehicle battery, according to an exemplary embodiment.

Referring to FIG. 1A, an exemplary vehicle 10 including the disclosed battery charging system 12 for charging and discharging a vehicle battery 14 is illustrated. It is to be appreciated that the vehicle battery 14 may also be referred to as a starting, lighting, and ignition (SLI) battery. The vehicle battery 14 is a rechargeable battery that is used to start the vehicle 10 and provide power to one or more electrical accessories 16 that are part of the vehicle 10 such as, but not limited to, headlights, taillights, and a radio or sound system. It is to be appreciated that the vehicle 10 may be any type of vehicle such as, but not limited to, a sedan, a truck, sport utility vehicle, van, or motor home. In the embodiment as shown in FIG. 1A, the vehicle 10 receives at least a portion of the motive power from an internal combustion engine (ICE) 18, and the vehicle 10 is either an ICE vehicle or a hybrid electric vehicle (HEV). In an alternative embodiment as shown in FIG. 1B, the vehicle 10 is an all-electric vehicle (EV) that receives all the motive power from one or more electric motors 20 that are powered by a traction battery pack 22.

Figure 1B:
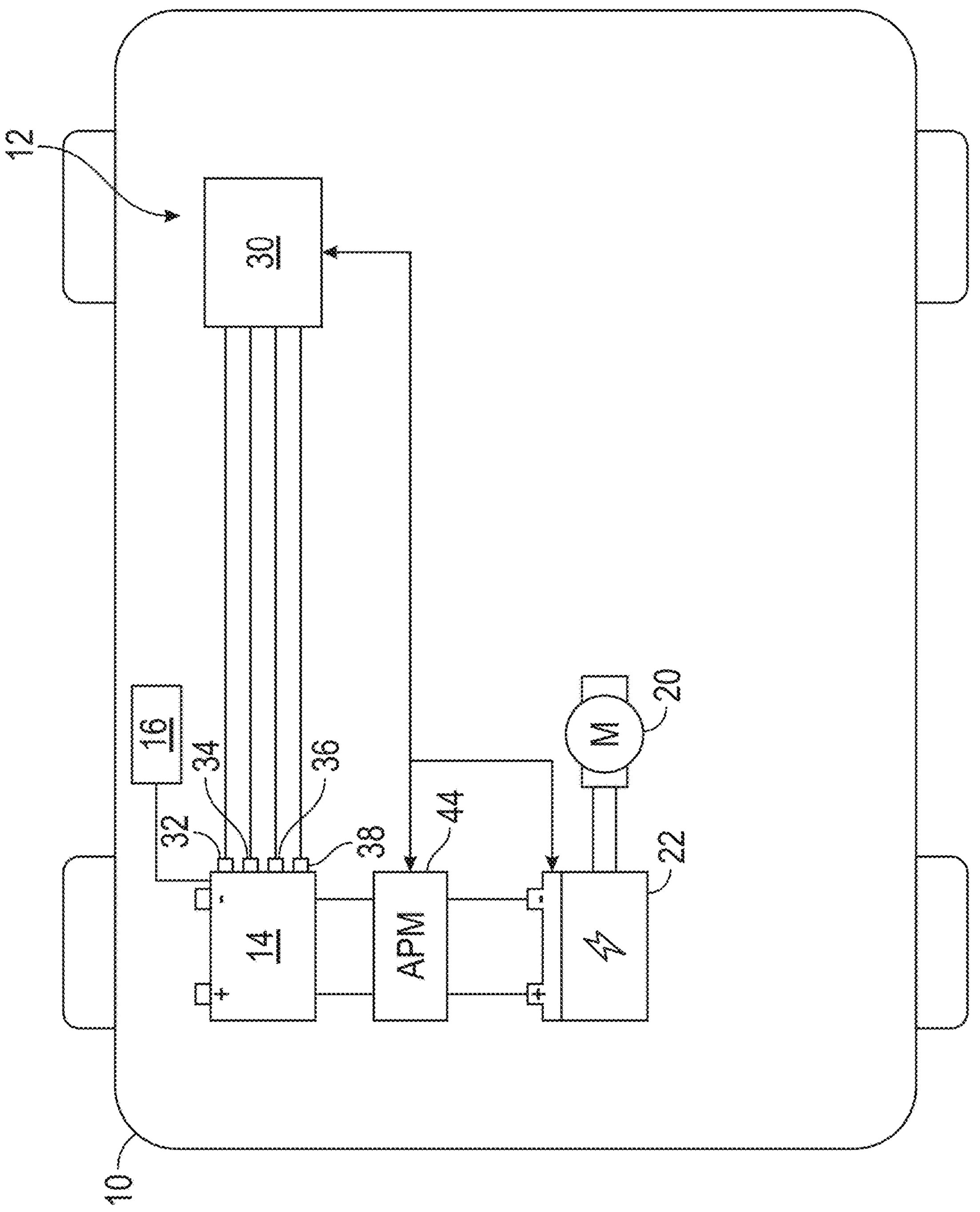
FIG. 1B is a schematic diagram of the disclosed system in a vehicle that is an all-electric vehicle (EV), according to an exemplary embodiment.

Referring to both FIGS. 1A and 1B, the battery charging system 12 includes the vehicle battery 14 and one or more controllers 30 in electronic communication with the vehicle battery 14. The one or more controllers 30 are in electronic communication with one or more voltage sensors 32, one or more current sensors 34, one or more state-of-charge sensors 36, and one or more temperature sensors 38. The one or more voltage sensors 32 monitor a voltage of the vehicle battery 14 in real-time, the one or more current sensors 34 monitor a discharge current of the vehicle battery 14 in real-time, the one or more state-of-charge sensors 36 monitor a state-of-charge of the vehicle battery 14 in real-time, and the one or more temperature sensors 38 monitor a battery temperature of the vehicle battery 14 in real-time. In one embodiment, the state-of-charge sensors 36 are omitted and the one or more controllers 30 determine the state-of-charge based on the voltage of the vehicle battery 14.

As seen in FIG. 1A, when the vehicle 10 includes the ICE 18, the vehicle battery 14 is electrically connected to a starter motor 40 and a generator 42. The vehicle battery 14 provides current to the starter motor 40 to crank the ICE 18 upon startup. The generator 42 is driven by a crankshaft (not shown) of the ICE 18 upon startup of the vehicle 10. The generator 42 includes a slew rate, where the slew rate indicates a maximum rate of change per unit time for either an output voltage or an output current of the generator 42. The generator 42 provides a regulator voltage control (RVC) voltage to the vehicle battery 14, where the RVC voltage is an output voltage of the generator 42 that is regulated based on the battery temperature of the vehicle battery 14. When the RVC voltage is less than the voltage of the vehicle battery 14, the vehicle battery 14 discharges and provides electrical power to the one or more electrical accessories 16 that are part of the vehicle 10.

Referring to FIG. 1B, when the vehicle 10 receives all of the motive power from the one or more electric motors 20 powered by the traction battery pack 22, the one or more controllers 30 are in electronic communication with the traction battery pack 22 and an auxiliary power module (APM) 44. The APM 44 includes a slew rate that indicates a maximum rate of change per unit time for either an output voltage or an output current of the APM 44. The APM 44 is in electrical communication with the traction battery pack 22 and converts high voltage supplied by the traction battery pack 22 down to a regulated voltage, which is referred to as the APM voltage. The APM voltage is provided to the vehicle battery 14, where the APM voltage is regulated based on the battery temperature of the vehicle battery 14. When the APM voltage is less than the voltage of the vehicle battery 14, the vehicle battery 14 discharges and provides electrical power to the one or more electrical accessories 16 that are part of the vehicle 10.

Figure 2:
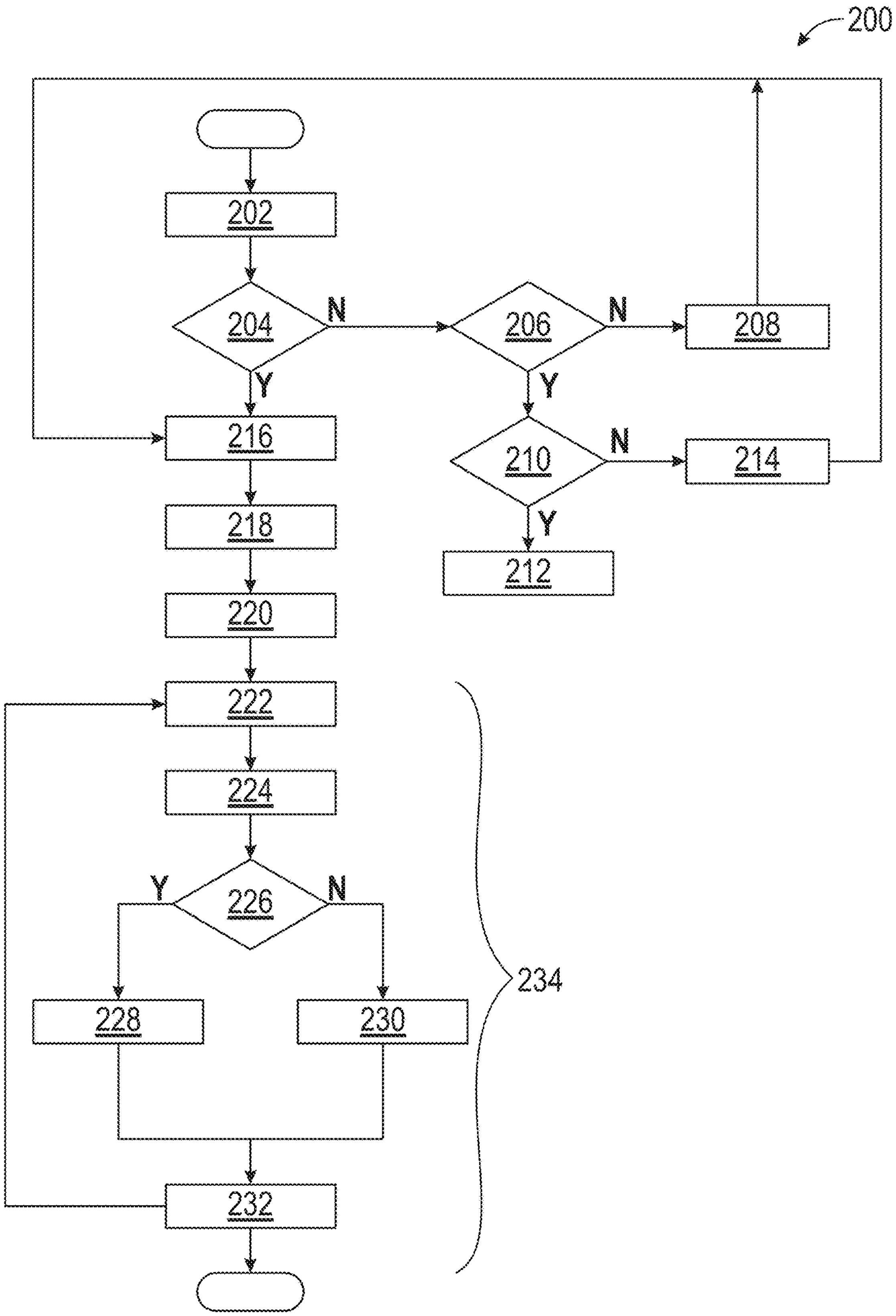
FIG. 2 is a process flow diagram illustrating a method for charging and discharging the vehicle battery by the system shown in FIG. 1A when the vehicle receives at least a portion of the motive power from an ICE, according to an exemplary embodiment.

An approach to charge and discharge the vehicle battery 14 based on the state-of-charge and the battery temperature shall now be described. FIG. 2 is a process flow diagram illustrating a method 200 for charging and discharging the vehicle battery 14, where the vehicle 10 is either an ICE vehicle or a HEV. It is to be appreciated that the method 200 creates a balance between a charging capacity and a discharging capacity of the vehicle battery 14 and maintains the vehicle battery 14 at a target state-of-charge range until its end of life. When the charging capacity and the discharging capacity of the vehicle battery 14 is balanced, the charging capacity is about equal to the discharging capacity. As an example, in one embodiment, the target state-of-charge range is from about seventy percent to about ninety percent.

Referring generally to FIGS. 1A and 2, the method 200 may begin at block 202. In block 202, the one or more controllers 30 determine the state-of-charge of the vehicle battery 14 from either the one or more voltage sensors 32 or the one or more state-of-charge sensors 36. It is to be appreciated that the state-of-charge of the vehicle battery 14 is determined at the start of the day, before startup of the ICE 18. The method 200 may then proceed to decision block 204.

In decision block 204, the one or more controllers 30 compare the state-of-charge of the vehicle battery 14 with the target state-of-charge range of the vehicle battery 14. In response to determining the state-of-charge of the vehicle battery 14 falls outside the target state-of-charge range, the method 200 may then proceed to decision block 206. Otherwise, the method 200 may proceed to block 216.

In decision block 206, the one or more controllers 30 compare the state-of-charge of the vehicle battery 14 with the lowest value of the target state-of-charge range to determine if the state-of-charge of the vehicle battery 14 is equal to or less than the lowest value of the target state-of-charge range. In response to determining the state-of charge of the vehicle battery 14 is greater than the highest value of the target state-of-charge range, the method 200 may proceed to block 208.

In block 208, the in response to determining the state-of-charge of the vehicle battery 14 is greater than the highest value of the state-of-charge range, the one or more controllers 30 continue to execute blocks 216, 218, 220, 222, 224, and 232 of the method 200 until the state-of-charge of the vehicle battery 14 falls within the target state-of-charge range (blocks 226, 228, and 230 are skipped). Once the target state-of-charge of the vehicle battery 14 falls within the target state-of-charge range, then the method may continue to proceed to blocks 216-232 as described below.

Referring back to decision block 206, in response to determining the state-of charge of the vehicle battery 14 is equal to or less than the lowest value of the target state-of-charge range, the method 200 may proceed to decision block 210. In decision block 210, the one or more controllers 30 compare the voltage of the vehicle battery 14 with a threshold resting voltage to determine if the voltage of the vehicle battery 14 is less than the threshold resting voltage. The threshold resting voltage indicates the vehicle battery 14 requires replacement. Merely by way of example, in one embodiment, the threshold resting voltage is about 11.8 Volts when the vehicle battery 14 is a 12 Volt battery. In response to determining the voltage of the vehicle battery 14 is less than the threshold resting voltage, the method proceeds to block 212, and the vehicle battery 14 is replaced, and the method 200 terminates. In response to determining the voltage of the vehicle battery 14 is equal to or greater than the threshold resting voltage, the method proceeds to block 214.

In block 214, the method 200 may then proceed to block 216. In block 216, the one or more controllers 30 first executes blocks 216 to 232, and then executes charging cycles 234 (while omitting block 224) to charge and discharge the vehicle battery 14 based on the RVC voltage.

Each charging cycle 234 is described in blocks 222-232 of the process flow diagram illustrated in FIG. 2. The one or more controllers 30 continue to execute the charging cycles 234 until the state-of-charge of the vehicle battery 14 is within the target state-of-charge.

Referring back to block 204, in response to determining the state-of-charge of the vehicle battery 14 falls within the target state-of-charge range, the method 200 proceeds to block 216. In block 216, the one or more controllers 30 instruct the vehicle battery 14 to discharge at the regular discharge target current for the first period of time A, while maintaining the voltage of the vehicle battery 14 at the regular discharge target voltage. In one embodiment, the vehicle battery 14 is a 12 Volt direct current battery and the regular discharge target current is about 0.25 C20, the regular discharge target voltage is no lower than about 11.5 Volts, and the first period of time A is about 11 seconds. It is to be appreciated that the regular discharge target voltage may vary based on the temperature of the vehicle battery 14. The method 200 may then proceed to block 218.

In block 218, the one or more controllers 30 instructs the vehicle battery 14 to discharge at a neutral discharge target current for the second period of time B at the neutral discharge target voltage. It is to be appreciated that the second period of time B is less than the first period of time A. In an embodiment where the vehicle battery 14 is a 12 Volt direct current battery, the neutral discharge target current is about 0.05 C20, the second period of time B is about 5 seconds, and the neutral discharge target voltage is at least about 12.3 Volts. It is to be appreciated that the neutral discharge target voltage may vary based on the temperature and the state-of-charge of the vehicle battery 14. The method 200 may then proceed to block 220.

In block 220, the one or more controllers 30 instruct the vehicle 10 to startup, where the vehicle 10 is started by providing electrical current to the starter motor 40. The generator 42 is driven by the ICE 18 upon startup of the vehicle 10. The method 200 may then proceed to block 222.

In block 222, the one or more controllers 30 may then instruct the generator 42 to execute at least a minimum number of charging cycles 234 to charge and discharge the vehicle battery 14 based on the RVC voltage, where each charging cycle 234 is described in blocks 222-232 of the process flow diagram illustrated in FIG. 2 and the minimum number of charging cycles 234 is six. Each charging cycle 234 includes raising the RVC voltage supplied to the vehicle battery 14 by the generator 42 to raise the voltage of the vehicle battery 14 to the neutral discharge target voltage described in block 218 for a third period of time C, lowering the RVC voltage of the vehicle battery 14 to the regular discharge target voltage described in block 216 for the first period of time A, and performing pulse charging where the RVC voltage is adjusted based on the slew rate of the generator 42. Specifically, in block 222, the one or more controllers 30 instruct the generator 42 to raise the RVC voltage supplied to the vehicle battery 14 to the neutral discharge target voltage for the third period of time C, where the third period of time is less than the first period of time A. In an embodiment, the third period of time is about five seconds. The method 200 may then proceed to block 224.

In block 224, the one or more controllers 30 instruct the generator 42 to drop the RVC voltage supplied to the vehicle battery 14 to increase the discharge current of the vehicle battery 14 to the regular discharge target current for the first period of time A. The method 200 may then proceed to decision block 226.

In decision block 226, the one or more controllers 30 monitor the one or more temperature sensors 38 to determine the battery temperature of the vehicle battery 14. The one or more controllers 30 compare the battery temperature with a target battery temperature range. In response to determining the battery temperature falls within the target battery temperature range, the method 200 may proceed to block 228. Otherwise, the method proceeds to block 230. In one non-limiting embodiment, the target battery temperature range is about 25° C.+/−5° C. It is to be appreciated that a maximum charging voltage of the vehicle battery 14 is 15.7 Volts.

In block 228, the one or more controllers 30 instruct the generator 42 to pulse charge the vehicle battery 14 by raising the RVC voltage supplied to the vehicle battery 14 at a rate that is limited the slew rate of the generator 42, where the pulse charge includes starting the RVC voltage at a neutral charge target voltage, increasing the RVC voltage to a maximum charging voltage of the vehicle battery 14, and maintaining the RVC voltage at the maximum charging voltage of the vehicle battery 14 for a fourth period of time D. The neutral charge target voltage is greater than the open circuit voltage (OCV) of the vehicle battery 14 at the target state-of-charge. In one embodiment, the neutral charge target voltage is 0.13 Volts greater than the open circuit voltage (OCV) of the vehicle battery 14 at the target state-of-charge, where the neutral charge target voltage is a fixed value for all values of the state-of-charge. In an embodiment where the vehicle battery 14 is a 12 Volt battery, the maximum charging voltage of the vehicle battery 14 is 15.7 Volts at 25° C.+/−5° C. during standard operating conditions. It is to be appreciated that the maximum charging voltage of the vehicle battery 14 is limited based on system loads that accept no more than 16 Volts. It is also to be appreciated that the maximum charging voltage of the vehicle battery 14 may be adjusted based on the temperature of the vehicle battery 14. In one embodiment, a temperature-adjusted value for the maximum charging voltage is expressed as follows: temperature-adjusted maximum charging voltage=Vstd+(25−Tt)*0.003*6, where Tt is the real temperature of the vehicle battery 14 and Vstd is a standard maximum charging voltage of the vehicle battery 14 during the pulse charge. In addition to the temperature of the vehicle battery 14, the maximum charging voltage may also be limited based on vehicle requirements. The fourth period of time D is less than the first period of time A. In an embodiment, the fourth period of time D is about four seconds.

Referring back to decision block 226, in response to determining the battery temperature falls outside the target battery temperature range, the method 200 may proceed to block 230. In block 230, the one or more controllers 30 instruct the generator 42 to pulse charge the vehicle battery 14 by raising the RVC voltage supplied to the vehicle battery 14 at a rate that is limited the slew rate of the generator 42, where the pulse charge includes starting the RVC voltage at the neutral charge target voltage, increasing the RVC voltage to a maximum temperature-adjusted voltage that is based on the battery temperature, and maintaining the RVC voltage at the maximum temperature-adjusted voltage of the vehicle battery 14 for the fourth period of time D. The maximum temperature-adjusted voltage of the vehicle battery 14 is a function of the temperature of the vehicle battery 14. In one embodiment, the maximum temperature-adjusted voltage of the vehicle battery 14 is 0.003 Volts/cell at an adjusted maximum charging voltage Vadjust, where Vadjust=Vstd+(25−Tt)*0.003*6, where Vstd represents the standard maximum charging voltage of the vehicle battery 14 during the pulse charge and Tt represents the real temperature of the vehicle battery 14, where the real temperature Tt is either less than 20° C. or greater than 30° C. The adjusted maximum charging voltage Vadjust is no higher than 15.2 Volts at the highest operating temperature of the vehicle battery 14, and no higher than 16 Volts at the lowest operating temperature of the vehicle battery 14. Alternatively, the maximum temperature-adjusted voltage is based on the manufacturer specifications. In an embodiment, the maximum temperature-adjusted voltage may also be limited based on vehicle requirements during certain operating conditions such as, for example, when the vehicle's high beams are on as well. As seen in FIG. 2, both blocks 228 and 230 may then proceed to block 232.

In block 232, the one or more controllers 30 instructs the generator 42 to reduce the RVC voltage to the neutral charge target voltage to charge the vehicle 10 for a fifth period of time E. The fifth period of time E is less than the first period of time A. In an embodiment, the fifth period of time E is about seven seconds. The method 200 may then return to blocks 202, 204, 216, or 222 to execute another charging cycle 234. In the alternative, if the vehicle battery 14 has undergone the minimum number of charging cycles 234, then the method 200 may terminate.

It is to be appreciated that the first period of time A, the second period of time B, the third period of time C, the fourth period of time D, and the fifth period of time E are each selected so that the total charging time required for the vehicle battery 14 is a predetermined percentage (i.e., x %) of the total running time of the vehicle 10. The total running time of the vehicle 10 is equal to the sum of the total charging time and the total discharging time (total running time=total charging time+total discharging time).

Figure 3:
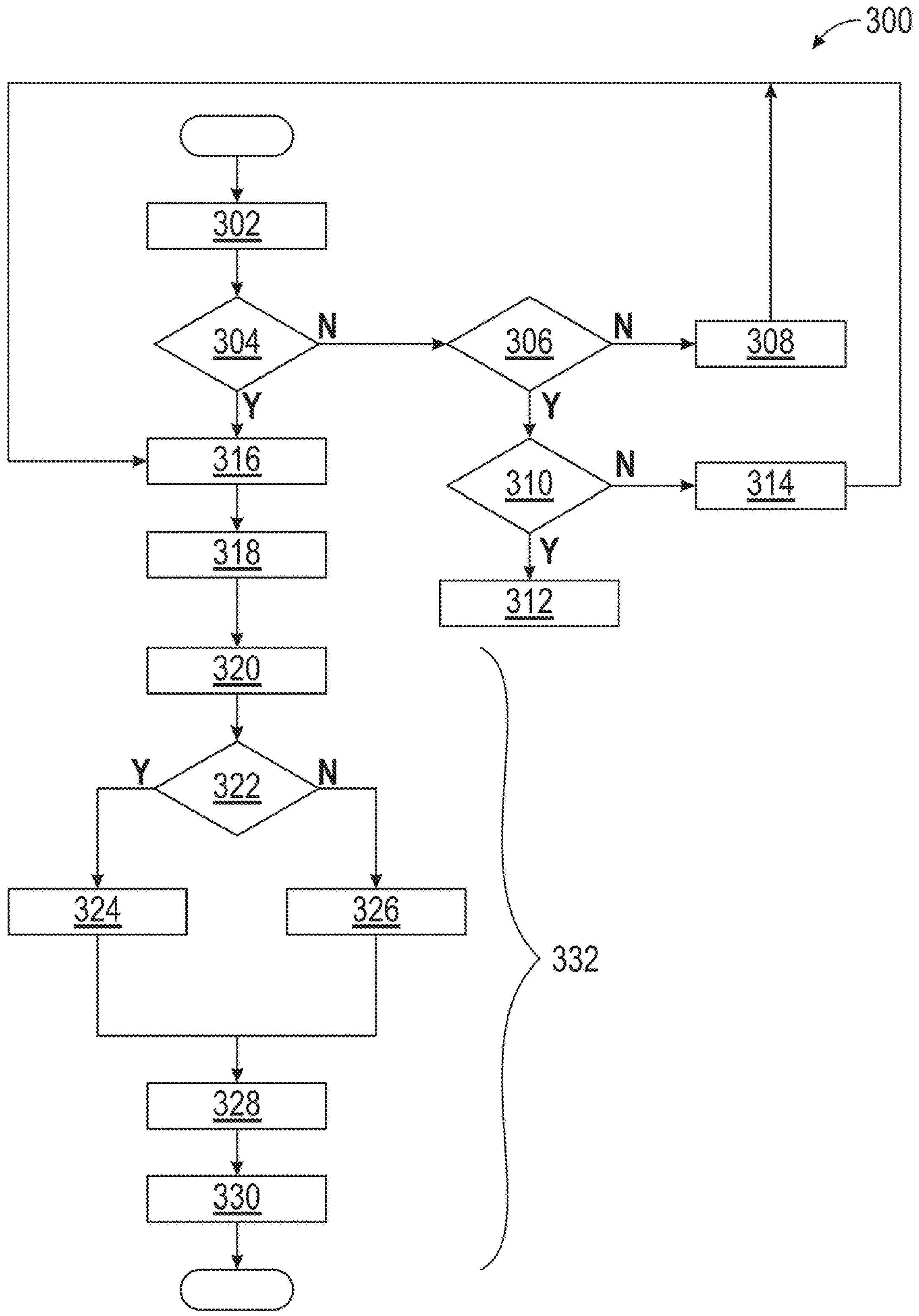
FIG. 3 is a process flow diagram illustrating a method for charging and discharging the vehicle battery by the system shown in FIG. 1B when the vehicle is an EV, according to an exemplary embodiment.

FIG. 3 is a process flow diagram illustrating a method 300 for charging and discharging the vehicle battery 14, where the vehicle 10 is an EV that receives all of its motive power from one or more electric motors 20 powered by the traction battery pack 22. Referring generally to FIGS. 1B and 3, the method 300 may begin at block 302. In block 302, the one or more controllers 30 determine the state-of-charge of the vehicle battery 14 from either the one or more voltage sensors 32 or the one or more state-of-charge sensors 36. The method 300 may then proceed to decision block 304.

In decision block 304, the one or more controllers 30 compare the state-of-charge of the vehicle battery 14 with the target state-of-charge range of the vehicle battery 14. In response to determining the state-of-charge of the vehicle battery 14 falls outside the target state-of-charge range, the method 300 may then proceed to decision block 306. Otherwise, the method 300 may proceed to block 316.

In decision block 306, the one or more controllers 30 compare the state-of-charge of the vehicle battery 14 with the lowest value of the target state-of-charge range to determine if the state-of-charge of the vehicle battery 14 is equal to or less than the target state-of-charge. In response to determining the state-of charge of the vehicle battery 14 is equal to or greater than the highest value of the target state-of-charge range, the method 300 may proceed to block 308.

In block 308, in response to determining the state-of-charge of the vehicle battery 14 is greater than the highest value of the state-of-charge range, the one or more controllers 30 continue to execute blocks 316, 318, 320, 328, and 330 of the method 300, while omitting blocks 322, 324, and 326, until the state-of-charge of the vehicle battery 14 falls within the target state-of-charge range. Once the state-of-charge of the vehicle battery 14 falls within the target state-of-charge range, then the method 300 may continue to proceed to blocks 316-330 as described below.

Referring back to decision block 306, in response to determining the state-of charge of the vehicle battery 14 is less than the lowest value of the target state-of-charge range, the method 300 may proceed to decision block 310. In block 310, the one or more controllers 30 compare the voltage of the vehicle battery 14 with the threshold resting voltage. In response to determining the voltage of the vehicle battery 14 is less than the threshold resting voltage, the method proceeds to block 312, and the vehicle battery 14 is replaced, and the method 300 terminates. In response to determining the voltage of the vehicle battery 14 is equal to or greater than the threshold resting voltage, the method proceeds to block 314.

In block 314, the one or more controllers 30 discharges the vehicle battery 14 at the initial discharge target current for the first period of time A2 as described in block 316 and then proceeds to block 318. The one or more controllers 30 may then continue to execute blocks 318-330 as described below while omitting block 320 until the state-of-charge of the vehicle battery 14 falls with target state-of-charge range.

Referring back to decision block 304, in response to determining the state-of-charge of the vehicle battery 14 falls within the target state-of-charge range, the method 300 proceeds to block 316. In block 316, the one or more controllers 30 instruct the vehicle battery 14 to discharge at the initial discharge target current for the first period of time A2, while maintaining the voltage of the vehicle battery 14 at the regular discharge target voltage. The initial discharge target current is based on the required current for the vehicle 10. In an embodiment, the first period of time A2 is about ten seconds, and the initial discharge target current is about 0.25 C20. The method 300 may then proceed to block 318.

In block 318, the one or more controllers 30 instruct the vehicle 10 to startup. The traction battery pack 22 provides power to the one or more electric motors 20 and the APM 44 provides the APM voltage to the vehicle battery 14 upon startup of the vehicle 10. The method 300 may then proceed to block 320.

In block 320, the one or more controllers 30 may then instruct the APM 44 to execute at least the minimum number of charging cycles 332 to charge and discharge the vehicle battery 14 based on the APM voltage, where each charging cycle 332 is described in blocks 320-330 of the process flow diagram illustrated in FIG. 3. Specifically, in block 320, the one or more controllers 30 instruct the APM 44 to drop the APM voltage supplied to the vehicle battery 14 to lower the voltage of the vehicle battery 14 to the regular discharge target voltage, which is no lower than about 11.5 Volts, for the second period of time B2. In an embodiment, the second period of time B is about thirteen seconds, and the second period of time B2 is greater than the first period of time A2. The method 300 may then proceed to decision block 322.

In decision block 322, the one or more controllers 30 monitor the one or more temperature sensors 38 to determine the battery temperature of the vehicle battery 14. The one or more controllers 30 compare the battery temperature with the target battery temperature range. In response to determining the battery temperature falls within the target battery temperature range, the method 300 may proceed to block 324. Otherwise, the method proceeds to block 326.

In block 324, the one or more controllers 30 instruct the APM to pulse charge the vehicle battery 14 by raising the APM voltage supplied to the vehicle battery 14 at a rate that is limited the slew rate of the APM 44, where the pulse charge includes starting the APM voltage at the neutral charge target voltage, increasing the APM voltage to the maximum charging voltage of the vehicle battery 14, and maintaining the APM voltage at the maximum charging voltage of the vehicle battery 14 for a third period of time C2. The third period of time C2 is less than the first period of time A2 and the second period of time B2. In an embodiment, the third period of time C2 is about three seconds.

Referring back to decision block 322, in response to determining the battery temperature falls outside the target battery temperature range, the method 300 may proceed to block 326. In block 326, the one or more controllers 30 instruct the APM 44 to pulse charge the vehicle battery 14 by raising the APM voltage supplied to the vehicle battery 14 at a rate that is limited the slew rate of the APM 44, where the pulse charge includes starting the APM voltage at the neutral charge target voltage, increasing the APM voltage to the maximum temperature-adjusted voltage that is based on the battery temperature, and maintaining the APM voltage at the maximum temperature-adjusted voltage of the vehicle battery 14 for the third period of time C2. The maximum temperature-adjusted voltage of the vehicle battery 14 is calculated based on the approach described in block 230 above. As seen in FIG. 3, both blocks 324 and 326 may then proceed to block 328.

In block 328, the one or more controllers 30 instruct the APM 44 to reduce the APM voltage to the neutral charge target voltage to charge the vehicle battery 14 for a fourth period of time D2. The fourth period of time D2 is less than the first period of time A2 and the second period of time B2. In an embodiment, the fourth period of time D2 is about eight seconds. The method 300 may then proceed to block 330.

In block 330, the one or more controllers 30 instruct the APM 44 to reduce the APM voltage to the regular discharge target voltage and the vehicle battery 14 discharges at the neutral discharge target current for a fifth period of time E2. The fifth period of time E2 is less than the first period of time A2 and the second period of time B2. In an embodiment, the fifth period of time E2 is about seven seconds. The method 300 may then either return to block 320 to execute another charging cycle 332. In the alternative, if the vehicle battery 14 has undergone the minimum number of charging cycles 332, then the method 300 may terminate.

Referring generally to the figures, the disclosed system for charging and discharging a vehicle battery provides various technical effects and benefits. Specifically, the system results in improving the state-of-charge of the vehicle battery during operation, improves fuel economy, creates a balance between the charging capacity and the discharging capacity of the vehicle battery, and maintains the vehicle battery at the target state-of-charge range until its end of life. Furthermore, the disclosed system may also remove sulfations on the lead plates of a lead-acid battery before crystallization to prevent or reduce instances of battery sulfation.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for charging and discharging a vehicle battery in a vehicle, wherein the vehicle receives at least a portion of motive power from an internal combustion engine (ICE) that drives a generator, the system comprising:

one or more controllers in electronic communication with the vehicle battery and the generator, wherein the one or more controllers include one or more processors that execute instructions to:

determine, by the one or more controllers, a state-of-charge of the vehicle battery;

compare the state-of-charge of the vehicle battery with a target state-of-charge range of the vehicle battery;

in response to determining the state-of charge of the vehicle battery falls within the target state-of-charge range, instruct the vehicle battery to discharge at a regular discharge target current for a first period of time while maintaining a voltage of the vehicle battery at a regular discharge target voltage;

instruct the vehicle battery to discharge at a neutral discharge target current for a second period of time at a neutral discharge target voltage, wherein the second period of time is less than the first period of time;

instruct the vehicle to startup, wherein the generator is driven by the ICE upon startup of the vehicle;

instruct the generator to execute at least a minimum number of charging cycles to charge and discharge the vehicle battery based on a regulator voltage control (RVC) voltage, wherein charging and discharging the vehicle battery creates a balance between a charging capacity and a discharging capacity of the vehicle battery; and instruct the generator to raise the RVC voltage supplied to the vehicle battery to raise a voltage of the vehicle battery to the neutral discharge target voltage for a third period of time, wherein the third period of time is less than the first period of time.

2. The system of claim 1, wherein the one or more controllers execute the charging cycle by:

instructing the generator to drop the RVC voltage supplied to the vehicle battery to increase a discharge current of the vehicle battery to the regular discharge target current for the first period of time.

3. The system of claim 2, wherein the one or more controllers execute the charging cycle by:

determining a battery temperature of the vehicle battery; and comparing the battery temperature with a target battery temperature range.

4. The system of claim 3, wherein the one or more controllers execute the charging cycle by:

in response to determining the battery temperature is within the target battery temperature range, instructing the generator to pulse charge the vehicle battery by raising the RVC voltage supplied to the vehicle battery at a rate that is limited a slew rate of the generator, and wherein the pulse charge includes:

starting the RVC voltage at a neutral charge target voltage;

increasing the RVC voltage to a maximum charging voltage of the vehicle battery; and maintaining the RVC voltage at the maximum charging voltage of the vehicle battery for a fourth period of time.

5. The system of claim 4, wherein the maximum charging voltage of the vehicle battery is adjusted based on the battery temperature, and wherein a temperature-adjusted maximum charging voltage is expressed as follows:

$$\text{temperature-adjusted maximum charging voltage} = V\text{std} + (25 - Tt) * 0.003 * 6$$

wherein Tt represents a real temperature of the vehicle battery and Vstd is a standard maximum charging voltage of the vehicle battery during the pulse charge.

6. The system of claim 3, wherein the one or more controllers execute the charging cycle by:

in response to determining the battery temperature falls outside the target battery temperature range, instructing the generator to pulse charge the vehicle battery by raising the RVC voltage supplied to the vehicle battery at a rate that is limited a slew rate of the generator, and wherein the pulse charge includes:

starting the RVC voltage at a neutral charge target voltage;

increasing the RVC voltage to a maximum temperature-adjusted voltage that is based on the battery temperature, wherein the maximum temperature-adjusted voltage of the vehicle battery is a function of the battery temperature; and maintaining the RVC voltage at the maximum temperature-adjusted voltage of the vehicle battery for a fourth period of time.

7. The system of claim 4, wherein the maximum temperature-adjusted voltage of the vehicle battery 14 is 0.003 Volts/cell at an adjusted maximum charging voltage, and wherein the adjusted maximum charging voltage is expressed as:

$$\mathrm{V}adjust = \mathrm{V}std + (25 - Tt) * 0.003 * 6$$

wherein Vadjust represents the adjusted maximum charging voltage, Tt represents a real temperature of the vehicle battery, and Vstd represents a standard maximum charging voltage of the vehicle battery during the pulse charge.

8. The system of claim 4, wherein the one or more controllers execute a charging cycle by:

instructing the generator to reduce the RVC voltage to a neutral charge target voltage to charge the vehicle for a fifth period of time, wherein the first period of time, the second period of time, the third period of time, the fourth period of time, and the fifth period of time are each selected so that a total charging time required for the vehicle battery is a predetermined percentage of a total running time of the vehicle.

9. The system of claim 1, wherein the one or more controllers execute instructions to:

compare the state-of-charge of the vehicle battery with a lowest value of the target state-of-charge range; and in response to determining the state-of charge of the vehicle battery is equal to or less than the lowest value of the target state-of-charge range, compare a voltage of the vehicle battery with a threshold resting voltage, wherein the threshold resting voltage indicates the vehicle battery requires replacement.

10. The system of claim 1, wherein the vehicle battery is a 12 Volt direct current battery, the regular discharge target current is about 0.25 C20, and the regular discharge target voltage is no lower than about 11.5 Volts.

11. A method for charging and discharging a vehicle battery in a vehicle, wherein the vehicle receives at least a portion of motive power from a ICE that drives a generator, the method comprising:

determining, by one or more controllers, a state-of-charge of the vehicle battery, wherein the one or more controllers are in electronic communication with the vehicle battery and the generator;

comparing, by the one or more controllers, the state-of-charge of the vehicle battery with a target state-of-charge range of the vehicle battery;

in response to determining the state-of charge of the vehicle battery falls within the target state-of-charge range, instructing the vehicle battery to discharge at a regular discharge target current for a first period of time while maintaining a voltage of the vehicle battery at a regular discharge target voltage;

instructing, by the one or more controllers, the vehicle battery to discharge at a neutral discharge target current for a second period of time at a neutral discharge target voltage, wherein the second period of time is less than the first period of time;

instructing, by the one or more controllers, the vehicle to startup, wherein the generator is driven by the ICE upon startup of the vehicle;

instructing, by the one or more controllers, the generator to execute at least a minimum number of charging cycles to charge and discharge the vehicle battery based on a regulator voltage control (RVC) voltage, wherein charging and discharging the vehicle battery creates a balance between a charging capacity and a discharging capacity of the vehicle battery; and instructing the generator to raise the RVC voltage supplied to the vehicle battery to raise a voltage of the vehicle battery to the neutral discharge target voltage for a third period of time, wherein the third period of time is less than the first period of time.

12. A system for charging and discharging a vehicle battery in a vehicle, wherein the vehicle receives all motive power from one or more electric motors powered by a traction battery pack in electrical communication with an auxiliary power module (APM), the system comprising:

one or more controllers in electronic communication with the vehicle battery and the APM, wherein the one or more controllers include one or more processors that execute instructions to:

determine, by the one or more controllers, a state-of-charge of the vehicle battery;

compare the state-of-charge of the vehicle battery with a target state-of-charge range of the vehicle battery;

in response to determining the state-of charge of the vehicle battery falls within the target state-of-charge range, instruct the vehicle battery to discharge at an initial discharge target current for a first period of time while maintaining a voltage of the vehicle battery at a regular discharge target voltage;

instruct the vehicle to startup, wherein the APM provides an APM voltage to the vehicle battery upon startup of the vehicle; and instruct the APM to execute at least a minimum number of charging cycles to charge and discharge the vehicle battery based on an APM voltage, wherein charging and discharging the vehicle battery creates a balance between a charging capacity and a discharging capacity of the vehicle battery, wherein the one or more controllers execute a charging cycle by:

instructing the APM to drop the APM voltage supplied to the vehicle battery to lower the voltage of the vehicle battery to the regular discharge target voltage for a second period of time, wherein the second period of time is greater than the first period of time.

13. The system of claim 12, wherein the one or more controllers execute a charging cycle by:

determining a battery temperature of the vehicle battery; and comparing the battery temperature with a target battery temperature range.

14. The system of claim 13, wherein the one or more controllers execute the charging cycle by:

in response to determining the battery temperature falls within the target battery temperature range, instructing the APM to pulse charge the vehicle battery by raising the APM voltage supplied to the vehicle battery at a rate that is limited a slew rate of the APM, wherein the pulse charge includes:

starting the APM voltage at a neutral charge target voltage;

increasing the APM voltage to a maximum charging voltage of the vehicle battery; and maintaining the APM voltage at the maximum charging voltage of the vehicle battery for a third period of time.

15. The system of claim 13, wherein the one or more controllers execute the charging cycle by:

in response to determining the battery temperature falls outside the target battery temperature range, instructing the APM to pulse charge the vehicle battery by raising the APM voltage supplied to the vehicle battery at a rate that is limited a slew rate of the APM, wherein the pulse charge includes:

starting the APM voltage at a neutral charge target voltage;

increasing the APM voltage to a maximum temperature-adjusted voltage that is based on the battery temperature, wherein the maximum temperature-adjusted voltage of the vehicle battery is a function of the battery temperature; and maintaining the APM voltage at the maximum temperature-adjusted voltage of the vehicle battery for a third period of time.

16. The system of claim 15, wherein the maximum temperature-adjusted voltage of the vehicle battery 14 is 0.003 Volts/cell at an adjusted maximum charging voltage, and wherein the adjusted maximum charging voltage is expressed as:

$$V_{adjust} = V_{std} + (25 - Tt) * 0.003 * 6$$

wherein Vadjust represents the adjusted maximum charging voltage, Tt represents a real temperature of the vehicle battery, and Vstd represents a standard maximum charging voltage of the vehicle battery during the pulse charge.

17. The system of claim 15, wherein the one or more controllers execute the charging cycle by:

instructing the APM to reduce the APM voltage to the neutral charge target voltage to charge the vehicle battery for a fourth period of time.

18. The system of claim 17, wherein the one or more controllers execute the charging cycle by:

instructing the APM to reduce the APM voltage to the regular discharge target voltage, wherein the vehicle battery discharges at a neutral discharge target current for a fifth period of time, wherein the first period of time, the second period of time, the third period of time, the fourth period of time, and the fifth period of time are each selected so that a total charging time required for the vehicle battery is a predetermined percentage of a total running time of the vehicle.

19. The method of claim 11, wherein the method includes executing the charging cycle by:

instructing the generator to drop the RVC voltage supplied to the vehicle battery to increase a discharge current of the vehicle battery to the regular discharge target current for the first period of time.

20. The method of claim 19, wherein the method includes executing the charging cycle by:

determining a battery temperature of the vehicle battery; and comparing the battery temperature with a target battery temperature range.

* * * * *